United States Patent
Qawami et al.

(10) Patent No.: US 6,920,539 B2
(45) Date of Patent: Jul. 19, 2005

(54) METHOD AND SYSTEM TO RETRIEVE INFORMATION

(75) Inventors: Shekoufeh Qawami, El Dorado Hills, CA (US); Chaitanya S. Rajguru, Folsom, CA (US); Sanjay S. Talreja, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 107 days.

(21) Appl. No.: 10/183,234

(22) Filed: Jun. 26, 2002

(65) Prior Publication Data

US 2004/0003192 A1 Jan. 1, 2004

(51) Int. Cl.$^7$ .............................................. G06F 12/00
(52) U.S. Cl. ....................................... 711/167; 711/105
(58) Field of Search ................................ 711/105, 167, 711/168; 365/233

(56) References Cited

U.S. PATENT DOCUMENTS

| | | | |
|---|---|---|---|
| 5,592,435 A | 1/1997 | Mills et al. | |
| 5,729,504 A | * 3/1998 | Cowles | 365/236 |
| 5,784,331 A | * 7/1998 | Lysinger | 365/230.06 |
| 6,256,716 B1 | * 7/2001 | Pham | 711/167 |
| 6,654,314 B2 | * 11/2003 | Toda et al. | 365/233 |

OTHER PUBLICATIONS

"64 Mbit (4mBx16 or 2Mbx32, Uniform Block) 3V Supply Flash Memories", preliminary data on new product development, Dec. 2001, pp. 1–64.

United States Patent Application, pending, Entitled—Virtual–Port Memory and Virtual–Porting, U.S. Appl. No. 09/895,982, filed Jun. 29, 2001, to Lance Dover.

* cited by examiner

Primary Examiner—Hiep T. Nguyen
(74) Attorney, Agent, or Firm—Trop, Pruner & Hu, P.C.

(57) ABSTRACT

Briefly, in accordance with an embodiment of the invention, a method and system to retrieve information from a memory is provided. The method may include transferring information from the memory in response to at least two synchronous burst read requests using pipelining.

10 Claims, 8 Drawing Sheets

METHOD AND SYSTEM TO RETRIEVE INFORMATION

BACKGROUND

Computing systems may employ many different types of architectures and algorithms for accessing information from memory. In some systems, the microprocessor may execute instructions many times faster than these instructions can be retrieved from memory. Accordingly, microprocessors may incur a significant amount of idle time while waiting for data to be retrieved from memory.

Thus, there is a continuing need for alternate ways to retrieve information from memory.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the claimed subject matter. However, it will be understood by those skilled in the art that the claimed subject matter may be practiced without these specific details. In other instances, well-known methods, procedures, components and circuits have not been described in detail so as not to obscure the claimed subject matter.

Embodiments of the claimed subject matter may include an apparatus for performing the operations herein. This apparatus may be specially constructed for the desired purposes, or it may comprise a general purpose computing device selectively activated or reconfigured by a program stored in the device. Such a program may be stored on a storage medium, such as, but is not limited to, any type of disk including floppy disks, optical disks, CD-ROMs, magnetic-optical disks, electromechanical disks, read-only memories (ROMs), random access memories (RAMs), electrically programmable read-only memories (EPROMs), electrically erasable and programmable read only memories (EEPROMs), flash memory, magnetic or optical cards, or any other type of media suitable for storing electronic instructions and data.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Figure 1:
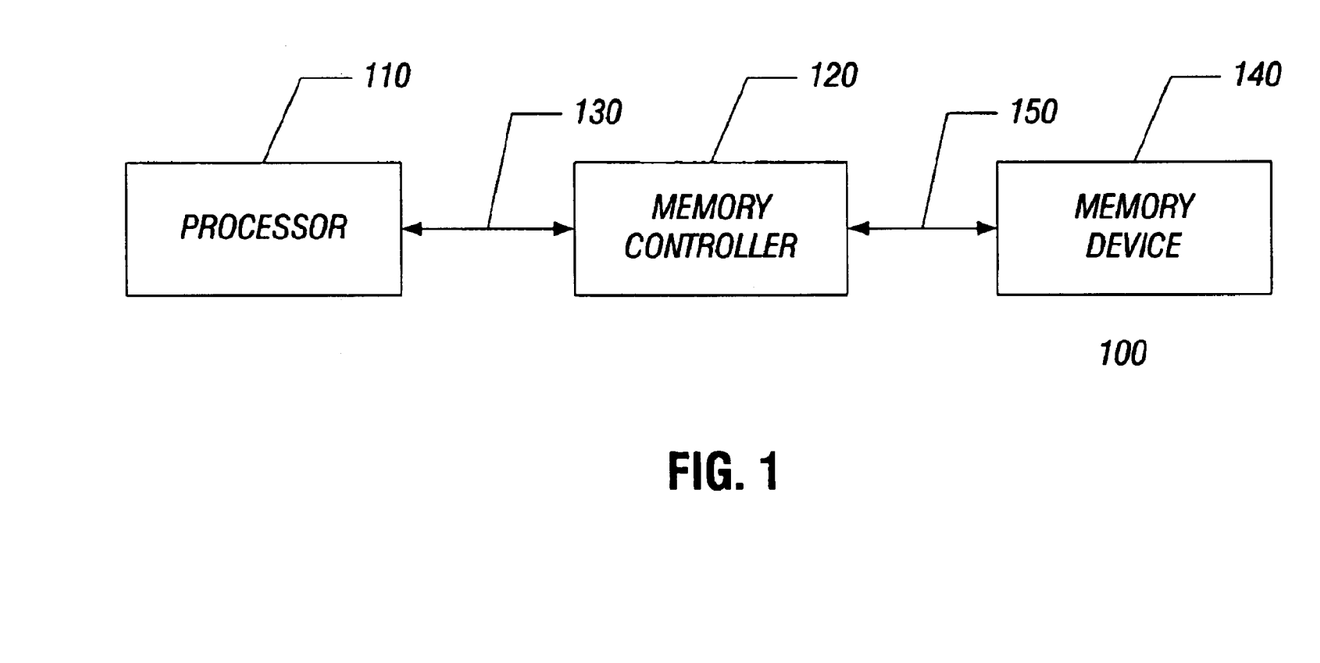
FIG. 1 is a block diagram of a computing system in accordance with an embodiment of the claimed subject matter.

Turning to FIG. 1, an embodiment of a computing system 100 is illustrated. Computing system 100 may be used in a variety of applications such as, for example, a personal digital assistant (PDA), a two-way pager, a cellular phone, a portable computer, a desktop computer, a workstation, a server, or video equipment. However it should be pointed out that the scope and application of the claimed subject matter is in no way limited to these examples.

In this embodiment, computing system 100 may comprise a processor 110 coupled to a memory controller 120 via a bus 130. In addition, computing system 100 may comprise a memory device 140 coupled to memory controller 120 via a bus 150. In some embodiments, the computing system 100 may implemented in a portable communication device that comprises a wireless transceiver (not shown) coupled to processor 110. Additionally, an input/output (I/O) device (not shown) such as, for example, a keypad or display, may be coupled to processor 110, although the scope of the claimed subject matter is not limited in this respect.

Bus 120 may be a data path comprising, for example, a collection of data lines to transfer information between processor 110 and memory controller 120. Similarly, bus 150 may be a data path to transfer information between memory controller 120 and memory device 140.

Although the scope of the claimed subject matter is not limited in this respect, processor 110 may comprise, for example, one or more microprocessors, digital signal processors, microcontrollers, or the like. Processor 110 may execute a software process such as, for example, a software program or an operating system, wherein the software process may use digital information such as, for example, data and/or instructions.

Memory controller 120 may control the transfer of information within computing system 100, e.g., between processor 110, memory controller 120, and memory device 140. That is, memory controller 120 may generate control signals, address signals, and data signals that may be associated with a particular write or read operation to memory device 140.

In some embodiments, memory controller 120 may be integrated ("on-chip") with processor 110 and/or with memory device 140. In alternate embodiments, memory controller 120 may be a discrete component or dedicated chip, wherein memory controller 120 is external ("off-chip") to processor 110 and memory device 140. In addition, processor 110 and memory device 140 may be discrete components. In other embodiments, portions of the functionality of memory controller 120 may be implemented in processor 110 or in memory device 140 as, for example, a software application, module, or routine.

Memory device 140 may be referred to as a storage device and may be adapted to store information such as, for example, instructions or data used by an operating system or a software program that may be executed by processor 110. In some embodiments, memory device 140 may be a volatile memory such as, for example, a static random access memory (SRAM) or a dynamic random access memory (DRAM), although the scope of the claimed subject matter is not limited in this respect. In alternate embodiments, memory device 140 may be nonvolatile memory such as, for example, an electrically programmable read-only memory (EPROM), an electrically erasable and programmable read only memory (EEPROM), a flash memory (NAND or NOR type, including multiple bits per cell), a ferroelectric random access memory (FRAM), a disk memory such as, for example, an electromechanical hard disk, an optical disk, a magnetic disk, or any other device capable of storing instructions and/or data. Other types of nonvolatile memory are also within the scope of the claimed subject matter, including volatile memory with a battery backup, as the battery may prevent the memory from losing its contents when the main power source is off.

It should be noted that herein, the terms data and information may be used interchangeably. That is, data may also refer to both data and/or instructions. In addition, the terms information and data may refer to a single bit of information or more than one bit of information.

In some embodiments, processor 110 may generate a request to retrieve data stored in memory device 140. The generated request may be transferred from processor 110 to memory controller 120. The request may include an address of the location of the information in memory. The request may be transferred to memory device 140 and information stored at the address may be retrieved and transferred from memory device 140 to processor 110 via memory controller 120 and buses 130 and 150.

Figure 2:
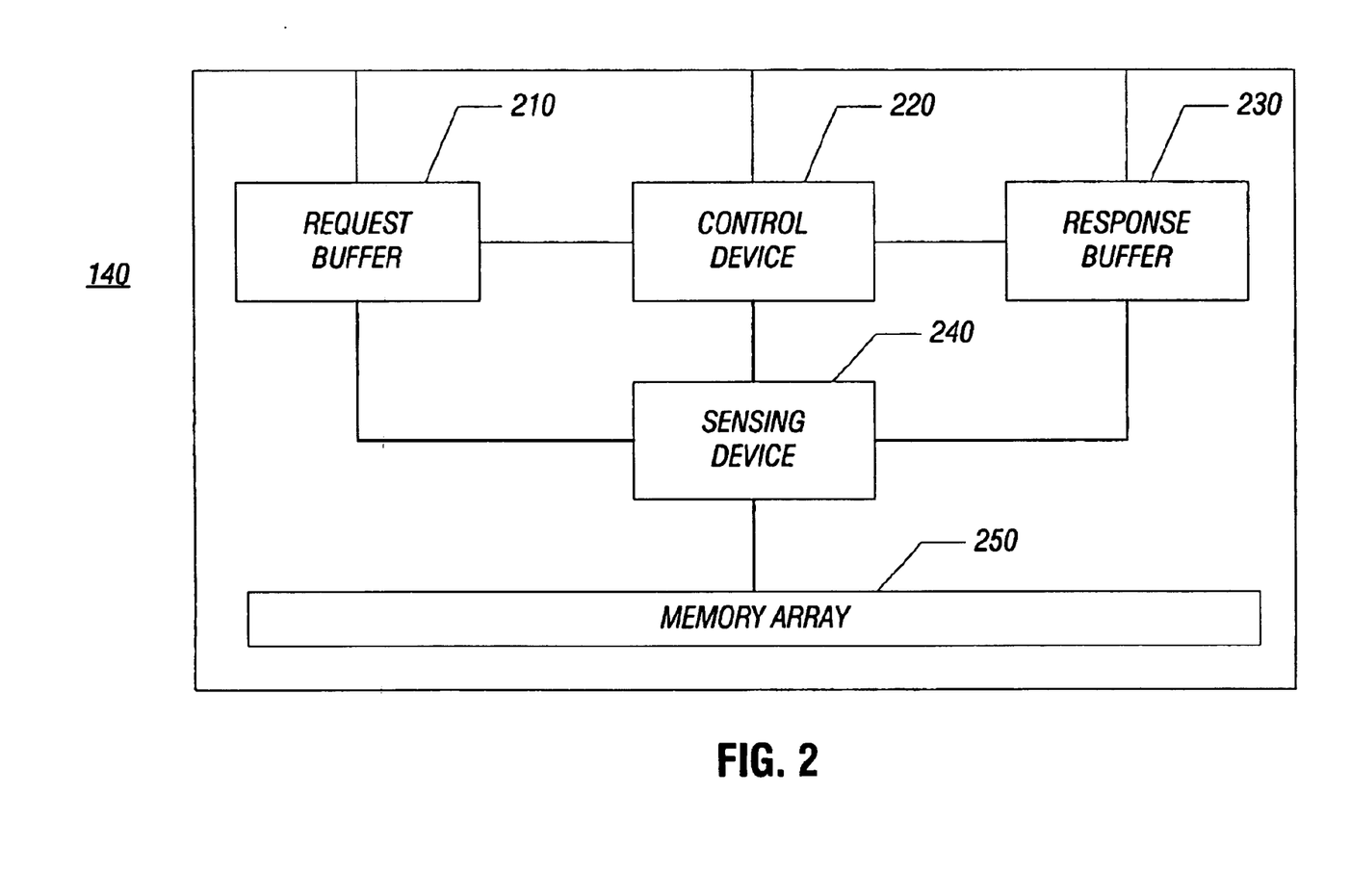
FIG. 2 is a block diagram of a memory device in accordance with an embodiment of the claimed subject matter.

Turning to FIG. 2, an embodiment of memory device 140 is illustrated. Memory device 140 may include a request buffer 210, a control device 220, a response buffer 230, a sensing device 240, and a memory array 250.

Request buffer 210 and response buffer 230 may be devices adapted to temporarily store information. For example, buffers 210 and 230 may be registers, queues, or latches, although the scope of the claimed subject matter is not limited in this respect. Response buffer 230 may be adapted to store 128 bits of information, although the scope of the claimed subject matter is not limited in this respect. In alternate embodiments, response buffer 230 may be adapted to store more or less than 128 bits of information.

Request buffer 210 may receive a read request from memory controller 120. This request may specify the amount of information to be retrieved from memory array 250 and may also include an address or addresses of the storage locations of the requested information in memory array 250. After receiving the read request, sensing device 240 may be used to sense the information at the requested address in memory array 250. Sensing device 240 may include, for example, sense amplifiers (not shown) to sense the information stored in memory array 250. After sensing the requested information from memory array 250, this information may be transferred to response buffer 230. The retrieved information may be transmitted from response buffer 230 to processor 110 via bus 150, memory controller 120, and bus 130.

Control device 220 may comprise circuitry to control the retrieval of information from memory array 250. For example, control device 220 may be adapted to receive control, data, and/or address signals from memory controller 120. In some embodiments, control device 220 may decode a received address, store the decoded address in request buffer 210, enable sensing device 240 to sense information stored at the decoded address from memory array 250, and transfer the sensed information to response buffer 230.

Computing system 100 may be adapted to perform synchronous burst read operations. A synchronous read operation may refer to synchronously reading information from memory device 140 using a clock signal (now shown). That is, information may be synchronously transmitted between processor 110, memory controller 120, and memory device 140 using a common reference clock (not shown). A burst read may refer to retrieving more than one unit of data in response to a single read request. A unit of data may be a byte of data, a word of data, or a double word of data. It should be noted that the terms "byte," "word," "double word," are terms denoting different units of data. As an example, a byte of data may refer to eight bits of data, a word may refer to 16 bits of data, and a double word may refer to 32 bits of data.

Figure 3:
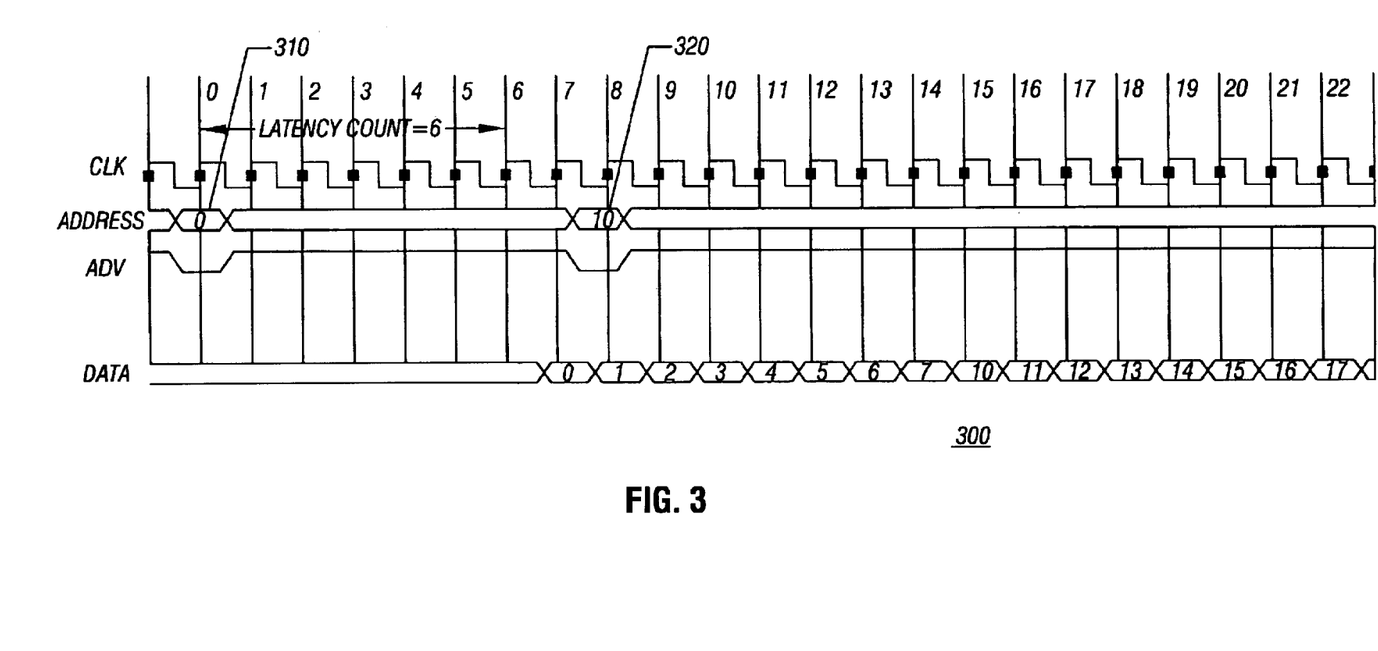
FIG. 3 is a timing diagram illustrating two synchronous burst read requests to retrieve information from a memory device in accordance with an embodiment of the claimed subject matter.

FIG. 3 is a timing diagram 300 illustrating two synchronous burst read requests (310, 320) to retrieve information from memory device 140 in accordance with an embodiment of the claimed subject matter. FIG. 3 is described with reference to FIGS. 1 and 2. Timing diagram 300 illustrates the relative timing of signals CLK, ADDRESS, ADV, and DATA that may be transferred between memory controller 120 (FIG. 1) and memory device 140 (FIGS. 1 and 2) via bus 150 (FIG. 1).

In this embodiment, twenty-two clock cycles of a clock signal (labeled CLK) are illustrated. Timing diagram 300 also illustrates that read requests, the transfer of information, and the transmitting of control signals in computing system 100 is synchronous using, for example, clock signal CLK.

Address signals (labeled ADDRESS) may be transmitted to memory device 140 from memory controller 120 using bus 150 and may illustrate two read requests initiated at clock cycle 0 and at clock cycle 8. The initial read request 310 at clock cycle 0 requests retrieval of information starting from hexadecimal address 0x0 of memory array 250 and the subsequent read request 320 at clock cycle 8 requests retrieval of information starting from address 0x10 of memory array 250. In some embodiments, these read requests may be initiated by processor 110 and transferred to memory controller 120 at substantially the same time or at different times. In response, memory controller 120 may control when these read requests are transferred to memory device 140.

In this embodiment, fixed-length synchronous burst read operations are illustrated in that a fixed number of words are requested during each read request. For example, initial read request 310 at clock cycle 0 requests the retrieval of eight words of information respectively from addresses 0x0, 0x1, 0x2, 0x3, 0x4, 0x5, 0x6, and 0x7. In this example, one word of information is located at each address. Subsequent read request 320 at clock cycle 8 requests eight words of information respectively from addresses 0x10, 0x11, 0x12, 0x13, 0x14, 0x15, 0x16, and 0x17. Read requests 310 and 320 may be referred to as burst read requests since more than one unit of data is transmitted from memory device 140 in response to a single read request. It should be noted that the amount of information retrieved in response to a single read request is not a limitation of the claimed subject matter. Although eight word synchronous burst reads are illustrated in timing diagram 300, other fixed-length synchronous burst reads may be realized in other embodiments. In addition, continuous synchronous burst read operations, rather than fixed-length, may be implemented in other embodiments. For example, see the discussion with reference to FIG. 8 below. Also, it should be noted that although only two read requests are illustrated in FIG. 3, this is not a limitation of the claimed subject matter. For example, more than two synchronous burst read requests may be used.

The valid address signal (labeled ADV) may be transmitted to memory device 140 and may indicate that a valid address is available on the signal ADDRESS. In alternate embodiments, signal ADV may be transmitted from memory device 140 to, for example, memory controller 120 to indicate that a valid address has been received by memory device 140.

During operation of computing system 100, read request 310 may be transferred from memory controller 120 to memory device 140 via bus 150. Read request 310 may be received by request buffer 210 and/or control device 220. In some embodiments, after receiving read request 310, control device 220 may enable retrieval of the information from memory array 250. For example, control device 220 may enable sensing of eight words of information located respectively at addresses 0x0 to 0x7 of memory array 250. Sensing device 240 may sense the eight words of information and control device 220 may enable transfer of this information to response buffer 230.

The amount of time to retrieve information from memory device 140 in response to a read request may be referred to as a latency time or latency count and may be measured in terms of clock cycles of signal CLK. The latency count may be limited by factors such as, for example, the processing speed of memory device 140 and other characteristics of the components of memory device 140. In some embodiments, the time to retrieve information from memory device 140 in response to a read request may be programmable. For example, a system designer or user may define the number of clock cycles between receiving a read request and outputting a first unit of data from memory device 140 in response to the read request. In setting the latency count, a system designer may consider the amount of time it takes to decode a received address, sense a predetermined number of words of information, transfer these words to response buffer 230, and transfer a word of information to bus 150 from response buffer 230.

In the embodiment illustrated in timing diagram 300, the latency count is six clock cycles of signal CLK. In other words, at least six clock cycles after receiving read request 310, the word of information stored at address location 0x0 is transferred to bus 150 from memory device 140. In this example, during the six clock cycles after receiving read request 310, the following may occur: control device 220 may decode the received addresses; sensing device 240 may sense eight words of information respectively located at addresses 0x0 to 0x7; control device 220 may enable transferring of the sensed eight words to response buffer 230; and control device 220 may enable transferring of the word of information associated with address 0x0 to bus 150 from response buffer 230.

Signal DATA may represent information output from an output terminal of memory device 140 to bus 150. In this embodiment, in response to read request 310, eight words of information is transferred from response buffer 320 to bus 150 via the output terminal of memory device 140. The word stored at location 0x0 may be transferred to bus 150 beginning in clock cycle 6; the word stored at location 0x1 may be transferred to bus 150 beginning in clock cycle 7; the word stored at location 0x2 may be transferred to bus 150 beginning in clock cycle 8; the word stored at location 0x3 may be transferred to bus 150 beginning in clock cycle 9; the word stored at location 0x4 may be transferred to bus 150 beginning in clock cycle 10; the word stored at location 0x5 may be transferred to bus 150 beginning in clock cycle 11; the word stored at location 0x6 may be transferred to bus 150 beginning in clock cycle 12; and the word stored at location 0x7 may be transferred to bus 150 beginning in clock cycle 13.

In this embodiment, in response to read request 320 information may be sensed by sensing device 240 while information retrieved in response to read request 310 is transferred from memory device 140. This may be referred to as pipelining or a pipelining process. A pipelined synchronous burst read operation may be implemented using memory device 140 since the sensing circuitry (e.g., sensing device 240) may be separate from the output circuitry (e.g., response buffer 230). In this embodiment, at least a portion of the information retrieved in response to read request 310 is transferred to bus 150 from output buffer 230 simultaneously while information is sensed from memory array 250 in response to read request 320. In other words, in the embodiment illustrated in FIG. 3, information is transferred from memory 140 in response to read requests 310 and 320 using pipelining.

In the embodiment illustrated in timing diagram 300, the eight words retrieved in response to read request 320 are transferred from memory device 140 directly following the information transferred from memory device 140 in response to read request 310. In other words, no invalid data or wait states appear on bus 150 between the information output in response to read requests 310 and 320. Wait states may refer to periods of time where the bus is idle, i.e., not transferring valid data. In this embodiment, the word stored at location 0x10 may be transferred to bus 150 between clock cycles 14 and 16 directly following the word stored at location 0x7 so that there are no wasted bus cycles with respect to signal DATA on bus 150 between clock cycles 7 and 22. The words stored respectively at address locations 0x11 to 0x17 are transferred to bus 150 from response buffer 230 directly following the word stored at location 0x10. As is shown in timing diagram 300, words may be transferred from response buffer 230 at a rate of approximately one word per clock cycle.

The reading of information illustrated in timing diagram 300 may be referred to as optimal pipelining. The term optimal pipelining may refer to the process of issuing at least two read requests, wherein the subsequent request is transferred to the memory at a predetermined time so that all the requested information is output in response to the initial request and all the information in response to the subsequent request is output from the memory directly following the information retrieved in response to the initial request. In the embodiment illustrated in timing diagram 300, optimal pipelining is achieved by transferring read request 320 to memory device 140 eight clock cycles after read request 310. In this example, eight clock cycles between the transferring of read requests 310 and 320 to memory device 140 allows enough time for memory device 140 to sense and output the requested information in response to read request 310 and sense the information in response to read request 320 while outputting all of the retrieved information in response to read request 310.

If read request 320 is transferred to memory device 140 prior to the end of the latency count, e.g., less than six clock cycles after sending read request 310, then memory device 140 may not complete sensing and outputting of information in response to read request 310. That is, the retrieving of information from memory array 250 may be interrupted and no data may be output from memory device 140 in response to read request 310, and only data retrieved in response to read request 320 may be output from memory device 140.

Figure 4:
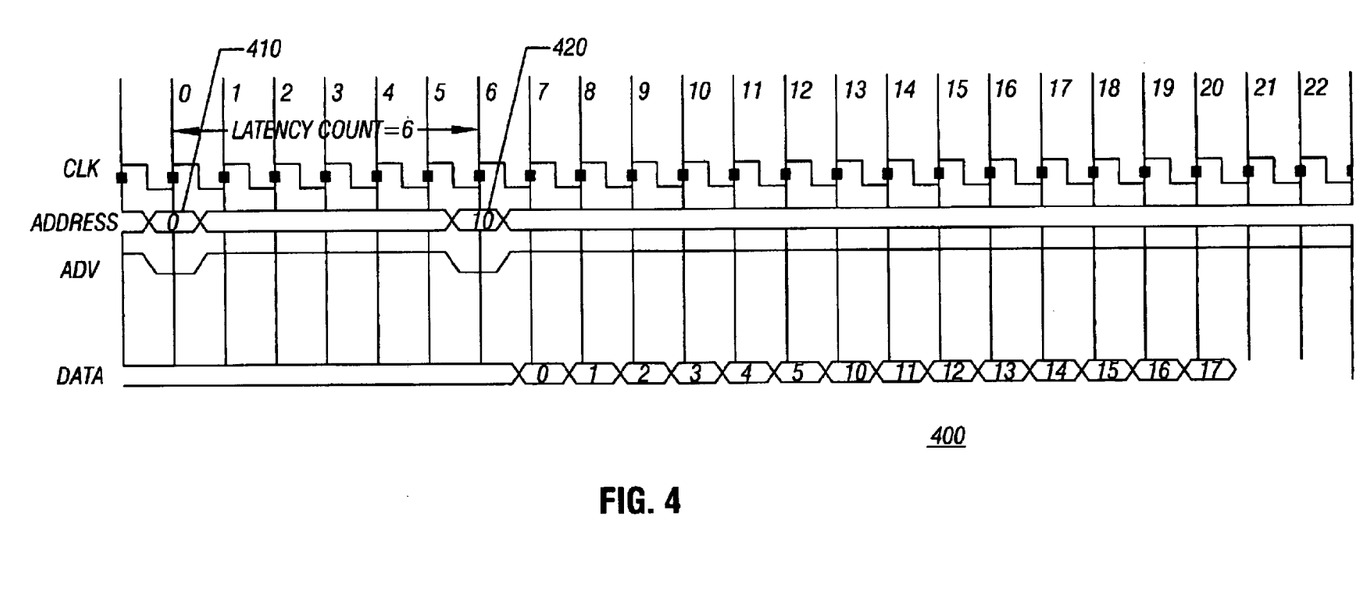
FIG. 4 is a timing diagram illustrating two synchronous burst read requests to retrieve information from a memory device in accordance with another embodiment of the claimed subject matter.

FIG. 4 is a timing diagram 400 illustrating two synchronous burst read requests (410, 420) to retrieve information from memory device 140 in accordance with another embodiment of the claimed subject matter. FIG. 4 is described with reference to FIGS. 1 and 2.

Timing diagram 400 illustrates a process for retrieving information from memory device 140 that may be referred to as early pipelining. Early pipelining may refer to issuing at least two read requests to a memory to retrieve information from the memory, wherein the subsequent read request is issued at a predetermined amount of time after the initial read request so that at least a portion, but not necessarily all, of the information retrieved in response to the initial request is output from the memory while information is sensed from the memory in response to the subsequent request.

In the embodiment illustrated in FIG. 4, read request 410 is transferred to memory device 140 from memory controller 120 at clock cycle 0 of signal CLK to request eight words of information respectively from addresses 0x0 to 0x7 of memory array 250, wherein one word of information is stored at each of the eight address locations 0x0 to 0x7. The latency count is six clock cycles of signal CLK.

Read request 420 is transferred to memory device 140 six clock cycles after read request 410 at clock cycle 6 of signal CLK. In this embodiment, in response to read request 410, eight words of information may be sensed from address locations 0x0 to 0x7 using sensing device 240. These sensed eight words are transferred to response buffer 230. In response read request 410, beginning between clock cycles 6 and 7, the six words respectively stored at address locations 0x0 to 0x5 are output from memory device 140 approximately one word per clock cycle.

However, in this embodiment, not all of the eight words sensed in response to read request 410 are output from memory device 140 since read request 420 is transferred to memory device 140 at clock cycle 6 of signal CLK. That is, only a portion of the requested eight words retrieved in response to read request 410 are output from memory device 140. The words stored at addresses 0x6 and 0x7 are not transferred from response buffer 230 to bus 150. Instead, beginning approximately six clock cycles after transferring read request 420 to memory device 140, information retrieved in response to read request 420 is transferred to bus 150 from memory device 140. In particular, in this embodiment, during the six clock cycles following clock cycle 6, memory device 140 performs a pipelining operation by sensing the information located at addresses 0x10 to 0x17 simultaneously while transferring at least a portion of the information retrieved in response to read request 410 to bus 150 from response buffer 230. Also, between clock cycles 6 and 13, the eight words of information sensed from addresses 0x10 to 0x17 may be transferred to response buffer 230.

Figure 5:
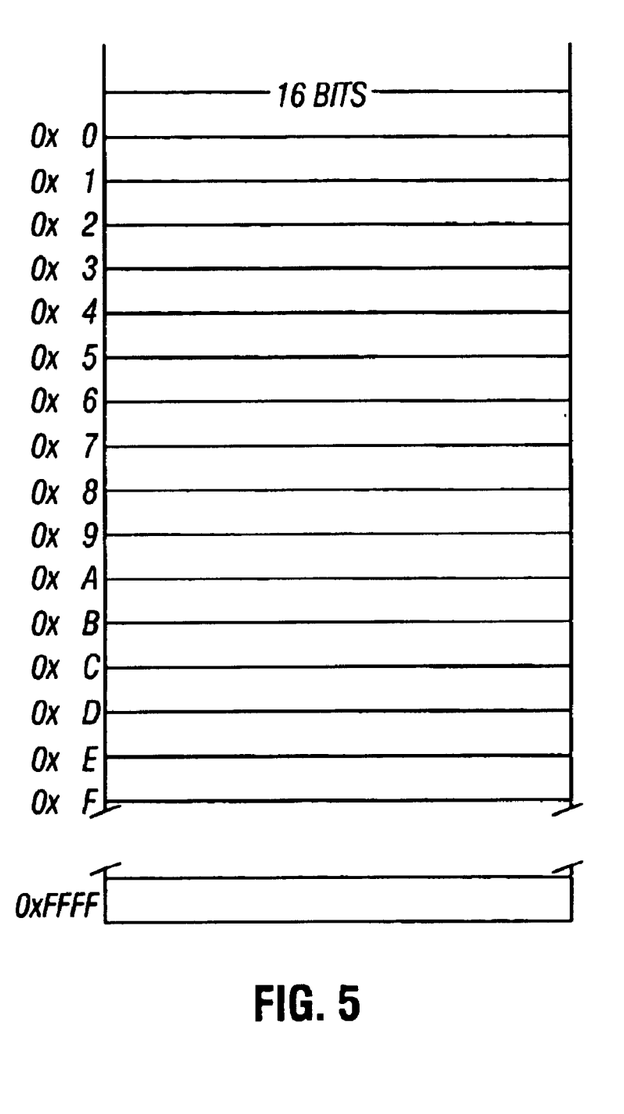
FIG. 5 is a diagram illustrating organization of information in a memory array in accordance with an embodiment of the claimed subject matter.

FIG. 5 is a diagram illustrating organization of information in a memory array in accordance with an embodiment of the claimed subject matter. This organization of information may be used in memory array 250 (FIG. 2). In this embodiment, several address locations (e.g., 0x0 to 0xFFFF) are shown wherein 16 bits (e.g., one word) of information may be stored at each address location.

In some embodiments, the sensing of information from memory array 250 by sensing device 240 may be accomplished using predetermined address boundaries. A predetermined address boundary such as, for example, a word boundary, may be defined for sensing information from a memory array. A page boundary is another type of boundary, wherein a page is a defined size of information. For example, a page may be defined as eight words of information and a page boundary may mean that information is retrieved at predetermined addresses in memory array 250 so that information is sensed in eight word blocks from memory array 250.

In some embodiments, each address may be a boundary. This may be referred to as a word boundary so that, for example, sensing device 240 may be adapted to sense one word of information from any address location in memory array 250 during a signal sense operation.

In alternate embodiments, a word line boundary may be defined as a multiple word boundary. For example, every eighth address location beginning at address 0x0 may be designated a word line boundary. In this example, boundary addresses are located at addresses 0x0, 0x8, 0x10, 0x18 . . . 0xFFF8 so that, for example, during a single sense operation, information in memory array 250 may be sensed in eight word blocks at the address boundaries of 0x0, 0x8, 0x10, 0x18 . . . 0xFFF8. If a read request received by memory device 140 requests eight words of information beginning at an address that is not a boundary address, then at least two sense operations may be used to retrieve the requested information. In other words, if a read request received by memory device 140 requests eight words of information beginning at an address such that the burst crosses a word line boundary, then at least two sense operations may be used to retrieve the requested information. This process of requesting information beginning at addresses that are not located at or aligned to a predetermined address boundary may be referred to as crossing an address boundary (e.g., word line boundary) to retrieve information.

Figure 6:
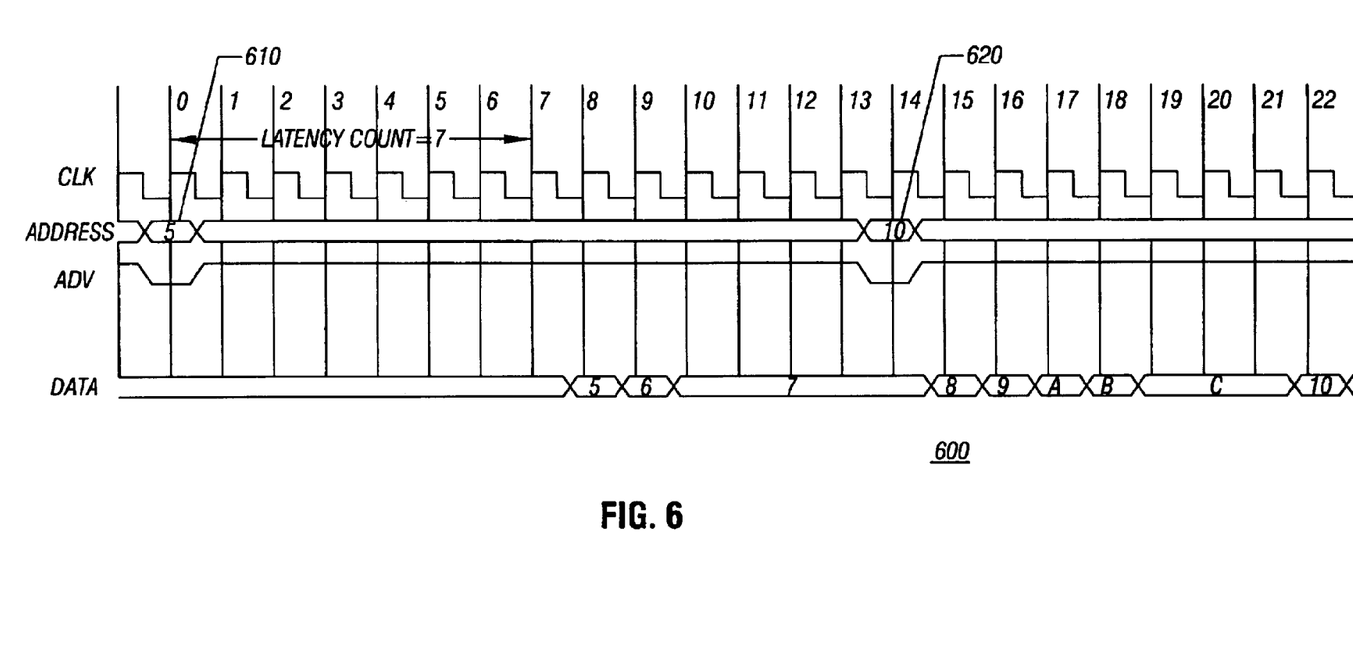
FIG. 6 is a timing diagram illustrating two synchronous burst read requests to retrieve information from a memory device in accordance with another embodiment of the claimed subject matter.

FIG. 6 is a timing diagram 600 illustrating two synchronous burst read requests (610, 620) to retrieve information from memory device 140 in accordance with another embodiment of the claimed subject matter. FIG. 6 is described with reference to FIGS. 1, 2, and 5.

Timing diagram 600 illustrates a process for requesting and retrieving information beginning at an address that is not located at a predetermined address boundary. As an example, information stored in memory device 140 is organized as is illustrated in FIG. 5. In addition, in this example, an address boundary may be set at every eighth address location beginning at address 0x0. Therefore, boundary addresses are located at addresses 0x0, 0x8, 0x10, 0x18 . . . 0xFFF8, so that, for example, during a single sense operation, information in memory array 250 may be sensed in eight word blocks at the address boundaries of 0x0, 0x8, 0x10, 0x18 . . . 0xFFF8.

In the embodiment illustrated in FIG. 6, the latency count is seven clock cycles of signal CLK. Read request 610 is transferred to memory device 140 from memory controller 120 at about clock cycle 0 of signal CLK to request eight words of information respectively from addresses 0x5 to 0xC of memory array 250. In this example, address 0x5 is not a boundary address. Thus, at least two sense operations may be used to retrieve the requested information in response to read request 610. For example, to retrieve the three words of information stored respectively at addresses 0x5 to 0x7, an initial sense operation is performed by sensing device 240 to sense eight words beginning at boundary address 0x0. Then, to retrieve the five words of information stored respectively at addresses 0x8 to 0xC, a subsequent sense operation is performed by sensing device 240 to sense eight words beginning at boundary address 0x8. The sensed information stored at address locations 0x5 to 0xC may be transferred to response buffer 230.

It should be noted that in this example, information may not be capable of being sensed beginning at address 0x5 in a single sense operation. This may be due to the configuration of sensing device 240. In some embodiments, the size, location, and number of the sensing components of sensing device 240 may only allow sensing of information beginning at the predetermined address boundaries.

Read request 620 is transferred to memory device 140 approximately fourteen clock cycles after read request 610 at about clock cycle 14 of signal CLK. Read request 620 requests eight words of information respectively from addresses 0x10 to 0x17 of memory array 250. In this example, address 0x10 is a boundary address. Therefore, this information may be sensed during a single sensing operation.

In this embodiment, a pipelined synchronous burst read is performed to retrieve data. That is, information may be sensed by sensing device 240 in response to read request 620 while information retrieved in response to read request 610 is transferred from memory device 140. In addition, the reading of information illustrated in timing diagram 600 may be referred to as optimal pipelining since at least two read requests are transferred to a memory, wherein the subsequent request is transferred to the memory at a predetermined time so that all the requested information is output in response to the initial request and all the information in response to the subsequent request is output from the memory directly following the information retrieved in response to the initial request. In the embodiment illustrated in timing diagram 600, optimal pipelining is achieved by transferring read request 620 to memory device 140 fourteen clock cycles after read request 610. In this example, fourteen clock cycles between the transferring of read requests 610 and 620 to memory device 140 allows enough time for memory device 140 to sense and output the requested information in response to read request 610 and sense the information in response to read request 620 while outputting the retrieved information in response to read request 610. It should be noted that this example of optimal pipelining includes requesting and retrieving more than one word of information beginning at an address that is not a predetermined boundary address.

Figure 7:
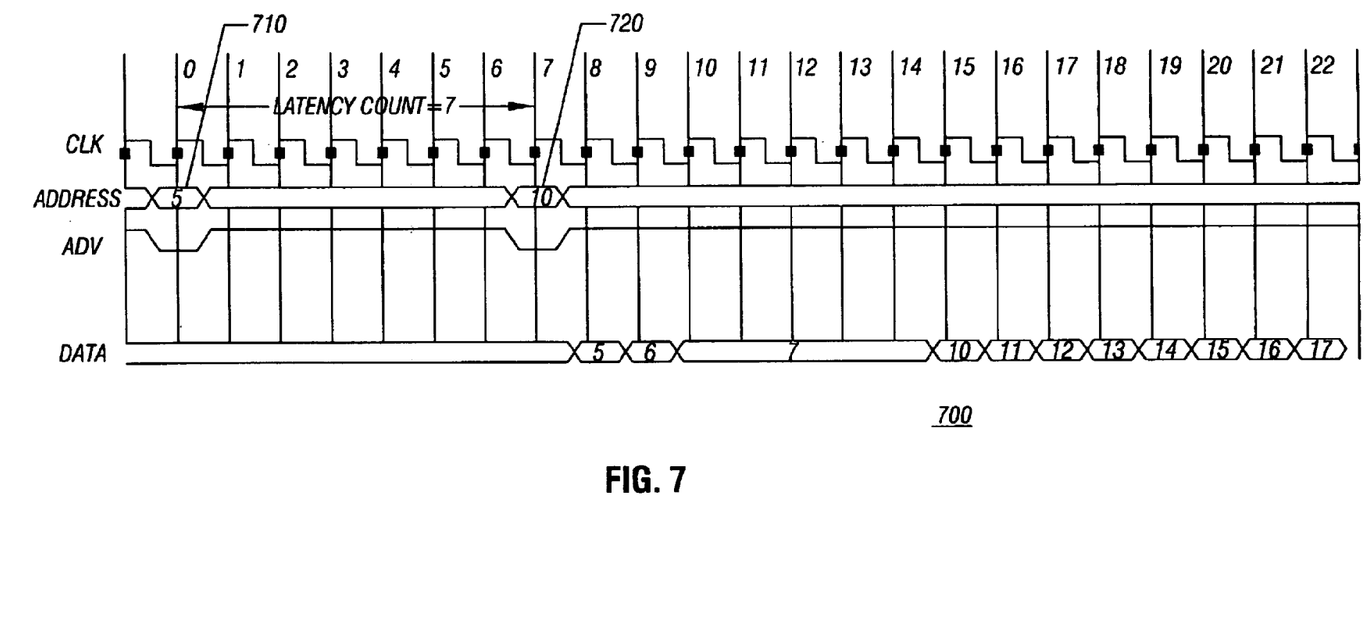
FIG. 7 is a timing diagram illustrating two synchronous burst read requests to retrieve information from a memory device in accordance with another embodiment of the claimed subject matter.

FIG. 7 is a timing diagram 700 illustrating two synchronous burst read requests (710, 720) to retrieve information from memory device 140 in accordance with another embodiment of the claimed subject matter. FIG. 7 is described with reference to FIGS. 1, 2, and 5.

Timing diagram 700 illustrates a process for retrieving information from memory device 140 that may also be referred to as early pipelining and also illustrates an example of early pipelining when the initial read request retrieves information beginning at an address that is not a boundary address.

As an example, information stored in memory device 140 is organized as is illustrated in FIG. 5. In addition, in this example, an address boundary may be set at every eighth address location beginning at address 0x0. In the embodiment illustrated in FIG. 7, the latency count is seven clock cycles of signal CLK. Read request 710 is transferred to memory device 140 from memory controller 120 at about clock cycle 0 of signal CLK to request eight words of information respectively from addresses 0x5 to 0xC of memory array 250. In this example, address 0x5 is not a boundary address. Thus, at least two sense operations may be used to retrieve the requested information in response to read request 710.

Read request 720 is transferred to memory device 140 approximately seven clock cycles after read request 710 at about clock cycle 7 of signal CLK. Read request 720 requests eight words of information respectively from addresses 0x10 to 0x17 of memory array 250. In this example, address 0x10 is a boundary address. Therefore, information retrieved in response to read request 720 may be sensed during a single sensing operation.

In this embodiment, a pipelined synchronous burst read is performed to retrieve data. That is, in response to read request 720, information may be sensed by sensing device 240 while at least a portion of the information retrieved in response to read request 710 is transferred from memory device 140. In addition, the reading of information illustrated in timing diagram 700 may be referred to as early pipelining since not all of the eight words sensed in response to read request 710 are output from memory device 140 since read request 720 is transferred to memory device 140 at clock cycle 7 of signal CLK. The words stored at addresses 0x8 to 0xC are not transferred from response buffer 230 to bus 150. Instead, approximately seven clock cycles after transferring read request 720 to memory device 140, information retrieved in response to read request 720 is transferred to bus 150 from memory device 140.

As is illustrated above, if two read requests are transferred to a memory, the timing of the transfer of the subsequent request after the initial request may allow for either early pipelining or optimal pipelining of information from a memory.

Equation 1 may be used for to determine the earliest time a subsequent read request may be transferred to a memory after an initial read request to achieve early pipelining when a synchronous burst read does not cross an address boundary. In other words, equation 1 provides the number of clock cycles between the initial and subsequent read requests for early pipelining when the read request does not cross an address boundary:

$$\text{Early pipelining} = \text{Latency Count (LC)} \tag{1}$$

Wherein:

LC, as discussed above, may be the amount of time (measured in terms of the number of clock cycles) to retrieve information from memory after receiving the corresponding read request.

Equation 2 may be used for to determine the amount of time a subsequent read request may be transferred to a memory after an initial read request to achieve optimal pipelining when a synchronous burst read does not cross an address boundary. In other words, equation 2 provides the number of clock cycles between the initial and subsequent read requests for optimal pipelining when the read request does not cross an address boundary:

$$\text{Optimal pipelining} = \text{Burst Length } (BL); \quad \text{if } BL > LC \qquad (2)$$
$$= LC; \quad \text{if } BL \leq LC$$

Wherein:

BL may be the number of data units (e.g., number of words) specified to be output from a memory by a read request The following table (labeled Table 1) provides early and optimal pipelining information when a read request does not cross an address boundary using equations 1 and 2.

TABLE 1

Early & Optimal Pipelining without crossing an address boundary.

| Latency Count (LC) | Burst Length (BL) | Earliest Pipelining (1) | Optimal Pipelining (2) |
|---|---|---|---|
| 3 | 4 | 3 | 4 |
| 4 | 4 | 4 | 4 |
| 5 | 4 | 5 | 5 |
| 6 | 4 | 6 | 6 |
| 7 | 4 | 7 | 7 |
| 8 | 4 | 8 | 8 |
| 9 | 4 | 9 | 9 |
| 3 | 8 | 3 | 8 |
| 4 | 8 | 4 | 8 |
| 5 | 8 | 5 | 8 |
| 6 | 8 | 6 | 8 |
| 7 | 8 | 7 | 8 |
| 8 | 8 | 8 | 8 |
| 9 | 8 | 9 | 9 |

Notes:
1. Earliest cycle that a subsequent request could be issued without completely interrupting the initial read request.
2. Earliest cycle that a subsequent request could be issued without interrupting any part of the initial read request.

As an example, equation 1 and Table 1 may be used to implement the embodiment of early pipelining illustrated in FIG. 4. That is, as is discussed above with reference to timing diagram 400, read request 410 does not cross an address boundary, the latency count is six, the burst length is eight, and therefore read request 420 is transferred to memory device 140 approximately six clock cycles after read request 410 to implement early pipelining.

As another example, equation 2 and Table 1 may be used to implement the embodiment of optimal pipelining illustrated in FIG. 3. That is, as is discussed above with reference to timing diagram 300, read request 310 does not cross an address boundary, the latency count is six, the burst length is eight, and therefore read request 320 is transferred to memory device 140 approximately eight clock cycles after read request 410 to implement optimal pipelining.

Equation 3 may be used for to determine the earliest time a subsequent read request may be transferred to a memory after an initial read request to achieve early pipelining when a synchronous burst read does cross an address boundary and two sense operations are performed in response to the initial read request. In other words, equation 3 provides the number of clock cycles between the initial and subsequent read requests to retrieve data from the initial sense operation when the read request does cross an address boundary:

$$\text{Early pipelining} = \text{Latency Count } (LC) \qquad (3)$$

Equation 4 provides the number of clock cycles between the initial and subsequent read requests to retrieve data from the subsequent sense operation of the initial read request when the read request does cross an address boundary:

$$\text{Early pipelining} = LC*2 \qquad (4)$$

Equation 5 may be used to determine the amount of time a subsequent read request may be transferred to a memory after an initial read request to achieve optimal pipelining when a synchronous burst read does cross an address boundary and two sense operations are performed in response to the initial read request. In other words, equation 5 provides the number of clock cycles between the initial and subsequent read requests for optimal pipelining when the read request does cross an address boundary:

$$\text{Optimal pipelining} = (LC*2) + X \text{ (if } X > 0) + Y \text{ (if } Y > 0) \qquad (5)$$

Wherein:

X = (the number of words in a subsequent sense operation of the two sense operations minus LC) if X>0; else X=0; and Y = (the number of words in an initial sense operation of the two sense operations minus LC) if Y>0; else Y=0.

The following table (labeled Table 2) provides early and optimal pipelining information when a read request does cross an address boundary using equations 3, 4, and 5. It should be noted that Table 2 is generated assuming that the output buffer (e.g., response buffer 230 of FIG. 2) is adapted to store eight words of information and assuming the word line boundary is eight words.

TABLE 2

Early & Optimal Pipelining with crossing an address boundary.

| Latency Count (LC) | Burst Length (BL) | Earliest Pipelining (1) | Optimal Pipelining (2) |
|---|---|---|---|
| 3 | 4 | 3 | 6 |
| 4 | 4 | 4 | 8 |
| 5 | 4 | 5 | 10 |
| 6 | 4 | 6 | 12 |
| 7 | 4 | 7 | 14 |
| 8 | 4 | 8 | 16 |
| 9 | 4 | 9 | 18 |
| 3 | 8 | 3 | 6 + X + Y (3) |
| 4 | 8 | 4 | 8 + X + Y (3) |
| 5 | 8 | 5 | 10 + X + Y (3) |
| 6 | 8 | 6 | 12 |
| 7 | 8 | 7 | 14 |
| 8 | 8 | 8 | 16 |
| 9 | 8 | 9 | 18 |

Notes:
1. Earliest clock cycle that a subsequent request may be issued without completely interrupting the initial read request.
2. Earliest clock cycle that a subsequent request may be issued without interrupting any part of the initial read request.
3. See Table 3 for more detail.

TABLE 3

Optimal pipelining when crossing word line boundary for Latency Counts of 3–5;
Output buffer = eight words; Optimal pipelining for subsequent request when the
initial request starting address of (1,2):

| Address Latency Count | Addr[2:0]=1 | Addr[2:0]=2 | Addr[2:0]=3 | Addr[2:0]=4 | Addr[2:0]=5 | Addr[2:0]=6 | Addr[2:0]=7 |
|---|---|---|---|---|---|---|---|
| 3 | 10 | 9  | 8  | 8  | 8  | 9  | 10 |
| 4 | 11 | 10 | 9  | 8  | 9  | 10 | 11 |
| 5 | 12 | 11 | 10 | 10 | 10 | 11 | 12 |

Notes:
1. Starting address aligned with address [2:0]; e.g. address[2:0]=0 includes all the addresses 0,8, . . . FFF8; e.g., address[2:0]=1 includes all the addresses 1,9, . . . FFF9
2. Earliest cycle that a subsequent request could be issued without interrupting any part of the initial read request.
3. Note that Addr[2:0]=0 does not cross a word line boundary and is discussed above in the detailed description.

As an example, equation 3 and Table 2 may be used to implement the embodiment of early pipelining illustrated in FIG. 7. That is, as is discussed above with reference to timing diagram 700, read request 710 does cross an address boundary, the latency count is seven, the burst length is eight, and therefore read request 720 is transferred to memory device 140 approximately seven clock cycles after read request 710 to implement early pipelining.

As another example, equation 5 and Table 2 may be used to implement the embodiment of optimal pipelining illustrated in FIG. 6. That is, as is discussed above with reference to timing diagram 600, read request 610 does cross an address boundary, the latency count is seven, the burst length is eight, and therefore read request 620 is transferred to memory 40 approximately fourteen clock cycles after read request 610 to implement optimal pipelining.

As may be appreciated, the embodiments described above with reference to FIGS. 3, 4, 6, and 7 illustrate fixed-length pipelined synchronous burst read operations, wherein a fixed number of words may be requested during each read request. Another type of pipelined synchronous burst read operation is a continuous pipelined burst read operation.

A continuous synchronous burst read operation may include, transmitting a read request to, for example, memory device 140 (FIG. 1), wherein the read request includes a starting address. The continuous burst read operation may further include in response to the read request, retrieving data located beginning at the starting address followed by sequentially retrieving data located at addresses subsequent to the starting address and outputting the retrieved data to bus 150. The continuous burst read operation may continue until all data stored at all addresses in memory device 140 is sensed and transferred from memory device 140 or until an event occurs to terminate the transfer of data in response to the first request.

Figure 8:
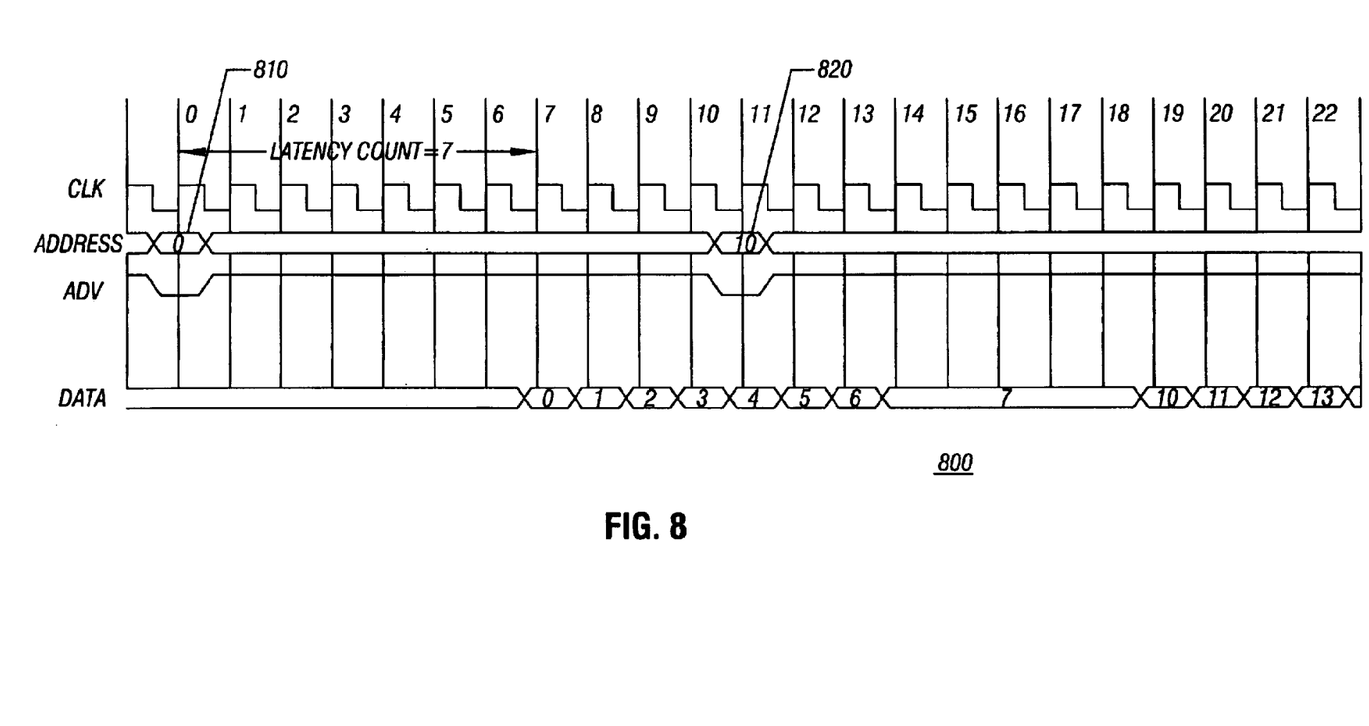
FIG. 8 is a timing diagram illustrating two synchronous burst read requests to retrieve information from a memory device in accordance with another embodiment of the claimed subject matter.

FIG. 8 is a timing diagram 800 illustrating two synchronous burst read requests (810, 820) to retrieve information from memory device 140 in accordance with another embodiment of the claimed subject matter. FIG. 8 is described with reference to FIGS. 1, 2, and 5. As an example, information stored in memory device 140 is organized as is illustrated in FIG. 5. The latency count in this embodiment is seven clock cycles of signal CLK.

If memory device 140 is adapted to support continuous burst read operations, then memory device 140 may receive read request 810 at clock cycle 0 to continuously and sequentially sense information beginning at address 0x0. For example, in response to read request 810, memory device 140 may sense information beginning at address 0x0 and transfer this sensed information to response buffer 230. Control device 220 may increment the sensing address to retrieve information at addresses subsequent to address 0x0. Information stored at addresses subsequent to address 0x0 may be sensed and transferred to response buffer 230. Information retrieved from previously sensed addresses may be located in response buffer 230 and may be transferred from response buffer 230 to bus 150 while information is being sensed at subsequent addresses.

The continuous transfer of information in response to read request 810 may continue until all information stored at all addresses in memory device 140 is transferred from memory device 140 or until an event occurs to terminate the transfer of data in response to the first request. In the embodiment illustrated in FIG. 8, information is transferred from addresses 0x0 to 0x7 in response to read request 810, and this continuous burst read is interrupted by read request 820, which is received by memory 140 at clock cycle 11 of signal CLK.

Read request 820 may be either a fixed-length or a continuous read request. In this embodiment, a pipelined synchronous read burst is performed to retrieve information in response to read requests 810 and 820. That is, in response to read request 820, information may be sensed by sensing device 240 while information retrieved in response to read request 810 is transferred from memory device 140.

After read request 810 is interrupted by read request 820, determining what information may be transferred to bus 150 in response to read request 810 while sensing read request 820 may be accomplished by determining the number of words remaining in response buffer 230. The number of words remaining in response buffer 230 may be determined by the following factors: size of response buffer 230; the address of the information that is located on bus 150 when read request 820 is transferred to memory 140 (e.g., for response buffer of eight words in size, the 3 least significant bits (LSB) of the address); the clock cycle at which subsequent read request 820 is received, and the latency count.

The following table (labeled Table 4) illustrates the information that may be output from memory device 140 from an initial continuous burst read operation after a subsequent read request is transferred to memory device 140. That is, Table 4 illustrates the output from a continuous burst read operation on bus 150 before information from a subsequent read request is placed on bus 150, wherein the size of response buffer is eight words.

TABLE 4

| Address (see note 3) | Latency Count | | | | | | |
|---|---|---|---|---|---|---|---|
| | 3 | 4 | 5 | 6 | 7 | 8 | 9 |
| Addr[2:0]=0 | 0-1-2-3 | 0-1-2-3-4 | 0-1-2-3-4-5 | 0-1-2-3-4-5-6 | 0-1-2-3-4-5-6-7 | 0-1-2-3-4-5-6-7-w | 0-1-2-3-4-5-6-7-w-w |
| Addr[2:0]=1 | 1-2-3-4 | 1-2-3-4-5 | 1-2-3-4-5-6 | 1-2-34-5-6-7 | 1-2-3-4-5-6-7-w | 1-2-3-4-5-6-7-w-w | 1-2-3-4-5-6-7-w-w-w |
| Addr[2:0]=2 | 2-3-4-5 | 2-3-4-5-6 | 2-3-4-5-6-7 | 2-3-4-5-6-7-w | 2-3-4-5-6-7-w-w | 2-3-4-5-6-7-w-w-w | 2-3-4-5-6-7-w-w-w-w |
| Addr[2:0]=3 | 3-4-5-6 | 3-4-5-6-7 | 3-4-5-6-7-w | 3-4-5-6-7-w-w | 3-4-5-6-7-w-w-w | 3-4-5-6-7-w-w-w-w | 3-4-5-6-7-w-w-w-w-w |
| Addr[2:0]=4 | 4-5-6-7 | 4-5-6-7-w | 4-5-6-7-w-w | 4-5-6-7-w-w-w | 4-5-6-7-w-w-w-w | 4-5-6-7-w-w-w-w-w | 4-5-6-7-w-w-w-w-w-w |
| Addr[2:0]=5 | 5-6-7-w | 5-6-7-w-w | 5-6-7-w-w-w | 5-6-7-w-w-w-w | 5-6-7-w-w-w-w-w | 5-6-7-w-w-w-w-w-w | 5-6-7-w-w-w-w-w-w-w |
| Addr[2:0]=6 | 6-7-w-w | 6-7-w-w-w | 6-7-w-w-w-w | 6-7-w-w-w-w-w | 6-7-w-w-w-w-w-w | 6-7-w-w-w-w-w-w-w | 6-7-w-w-w-w-w- |
| Addr[2:0]=7 | 7-w-w-w | 7-w-w-w-w | 7-w-w-w-w-w | 7-w-w-w-w-w-w | 7-w-w-w-w-w-w-w | 7-w-w-w-w-w-w-w-w | 7-w-w-w-w-w-w-w-w-w |
| Notes | 1, 2 | 1, 2 | 1, 2 | 1, 2 | 1, 2 | 1, 2 | 1, 2 |

1. Data from address[2:0]=0, 1, 2, 3, etc. of continuous burst may be on the bus before data from subsequent request is placed on the bus e.g. 0-1-2-3 may mean data from address[2:0]=0 to 3 of continuous burst may be placed on the bus before data from subsequent request is on the bus e.g. 0-1-2-3-4-5-6-7-w-w may mean data from address [2:0]=0 to 7 of continuous burst may be placed on the bus followed by two wait states before data from subsequent request is on the bus 2. w is Wait State for one clock cycle 3. Addr [2:0] of continuous burst on the bus when request 820 was received.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A method comprising:

sensing data in a memory in response to a first burst read request;

transferring out of the memory less than all of the data; and interrupting the transfer of sensed data in response to receipt of a second burst read request.

2. The method of claim 1 including sensing data in response to the second burst read request after interrupting the transfer of sensed data in response to the first burst read request.

3. The method of claim 1 including simultaneously sensing and transferring data for said second burst read request.

4. An article comprising a computer medium storing instructions that, if executed, enable a processor-based system to:

sense data in a memory in response to a first burst read request;

transfer out of the memory less than all of the data; and interrupt the transfer of sensed data in response to receipt of a second burst read request.

5. The article of claim 4 further storing instructions that, if executed, enable the processor-based system to sense data in response to the second burst read request after interrupting the transfer of sensed data in response to the first burst read request.

6. The article of claim 4 further storing instructions that, if executed, enable the processor-based system to simultaneously sense and transfer data for said second burst read request.

7. A system comprising:

a controller; and a memory coupled to said controller storing instructions to cause said controller to sense data in response to a first burst read request, transfer out of the memory less than all of the data, and interrupt the transfer of sensed data in response to receipt of a second burst read request.

8. The system of claim 7 wherein said memory includes a memory array storing the sensed data.

9. The system of claim 7 wherein said memory stores instructions to enable the controller to sense data in response to the second burst read request after interrupting the transfer of sensed data in response to the first burst read request.

10. The system of claim 7 wherein said memory further stores instructions that enable the processor-based system to simultaneously sense and transfer data out of said memory for said second burst read request.

* * * * *